March 10, 1953  R. B. GRAY  2,630,820
GAS METERING SYSTEM CONTROL
Filed Aug. 5, 1949

Inventor
Robert B Gray
By Ralph Hammar
Attorney

Patented Mar. 10, 1953

2,630,820

UNITED STATES PATENT OFFICE 2,630,820

GAS METERING SYSTEM CONTROL

Robert B. Gray, Erie, Pa., assignor to American Meter Company, Erie, Pa., a corporation of Delaware Application August 5, 1949, Serial No. 108,776

3 Claims. (Cl. 137—110)

This invention is intended to improve relays such as used in gas metering systems for cutting in supplementary metering circuits when the flow exceeds the capacity of the primary metering circuit. Since such relays are customarily operated by gas bled from the lines, leakage is kept to a minimum. Further objects and advantages appear in the specification and claims.

Figure 1:
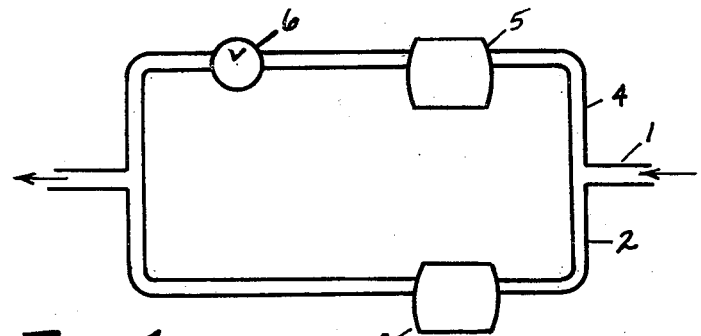
Figure 2:
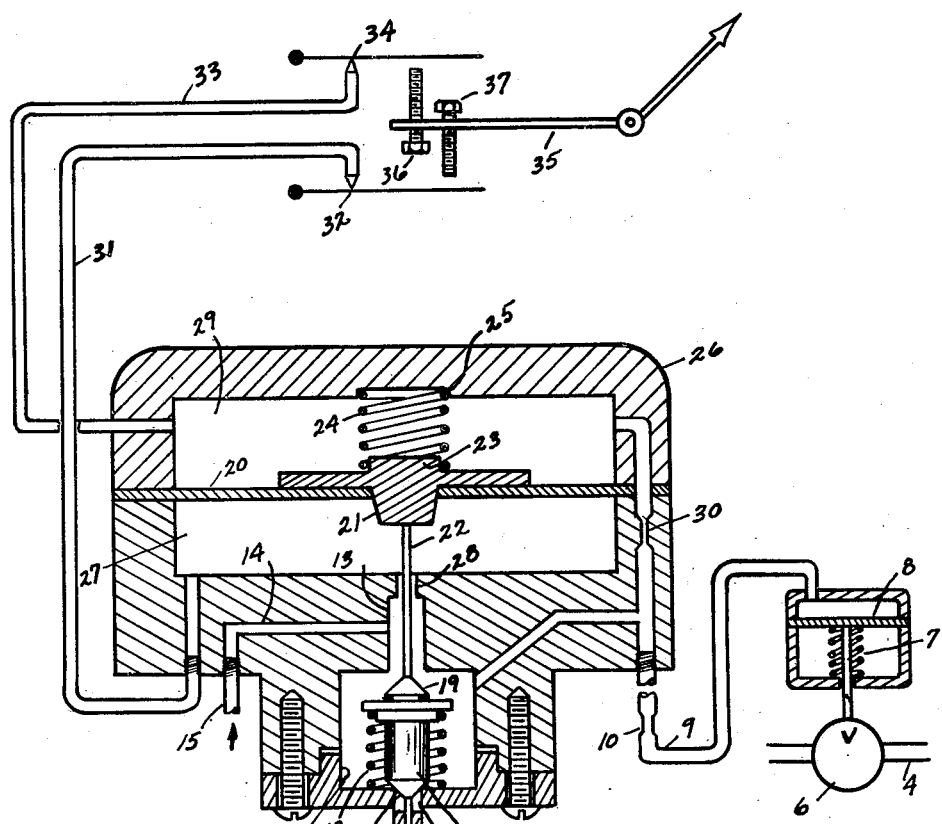

In the drawing, Fig. 1 is a diagrammatic view of a gas metering system, and Fig. 2 is a section through the relay controlling the secondary or supplementary metering circuit.

In Fig. 1 is shown a gas line 1 connected to a primary metering circuit 2 having a meter 3 and also to a secondary metering circuit 4 having a meter 5. When the gas flow is within the capacity of the primary meter 3 the secondary metering circuit 4 is shut off by a valve 6. This valve is opened whenever the gas flow exceeds the capacity of the primary metering circuit. The foregoing is a typical gas metering system.

As shown in Fig. 2 the valve 6 is controlled by a spring 7 and a diaphragm 8. The spring 7 biases the valve to the open position so that upon failure of the pressure supply the valve is opened and the full metering capacity is available. The valve is closed by pressure applied to the upper surface of the diaphragm 8 and supplied through a line 9 connected to a chamber 11 housing a valve 12. At the upper end of the chamber 11 is a chamber 13 fed through a way 14 from a pressure supply line 15. At the lower end of the chamber 11 is a vent passageway 16. When the valve 12 is in the position illustrated a conical face 17 at the lower end shuts off the vent passage and full line pressure from the pressure supply 15 is fed to the line 9 leading to the upper side of the diaphragm 8. Under this condition the control pressure for the valve 6 is equal to the pressure of the supply line 15. The valve 12 is normally biased by a spring 18 to an upper position in which a conical face 19 shuts off the lower end of the chamber 13 and thereby cuts off the pressure supply to the line 9. In this position the vent 16 is opened so that the pressure within the chamber 11 and within the line 9 is vented to atmosphere. In this position of the valve 12 the control pressure is zero with reference to atmospheric pressure.

The position of the valve 12 is controlled by a diaphragm 20 which may, for example, be made of rubber and have bonded in its center a metal plug 21, the lower end of which cooperates with the upper end of a stem 22 on the valve 12. On the upper side of the plug 21 is a seat 23 for a compression spring 24 having its upper end fixed in a seat 25 on a cover plate 26. The spring 24 is stronger than the spring 18 and normally holds the valve 12 in the lower position illustrated.

On the lower side of the diaphragm 20 is a chamber 27 which is fed through the restricted passageway 28 surrounding the valve stem 22. This restricted passageway is self-cleaning in that particles of dirt are dislodged by the reciprocating movement of the valve stem 22 incident to the operation. On the upper side of the diaphragm 20 is a chamber 29 fed from the control pressure line 9 through a somewhat larger restriction 30. The chamber 27 is connected by a line 31 to a nozzle and flapper unit 32 which is normally closed and which, when opened, vents the chamber 27 to atmosphere. The chamber 29 is connected by a line 33 to a normally closed nozzle and flapper unit 34 which, when opened, vents the chamber 29 to atmosphere. When either of the nozzle and flapper units 32, 34 are opened the pressure in the corresponding chamber drops. The restrictions 28 and 30 do not permit sufficient flow to maintain the pressure.

The nozzle and flapper units are controlled by an arm 35 positioned in accordance with the registration of the primary meter 3. The arm 35 carries set screws 36 and 37 which respectively open the nozzle and flapper units 34 and 32 when the primary meter 3 registers greater than "high" or less than "low." These high and low values are determined by the adjustment of the screws 36 and 37.

The relay is illustrated for the condition in which the gas flow is within the capacity of the primary meter 3. In this position the full pressure from the supply line 15 is supplied to the line 9 leading to the diaphragm 8 controlling the valve 6 and the valve 6 controlling the secondary metering circuit 4 is accordingly closed. Full supply pressure is also supplied to the chamber 27 through the restricted passageway 28 and also to the chamber 29 through the restricted passageway 30. The pressures on opposite sides of the diaphragm 20 are accordingly equalized and the spring 24 holds the valve 12 in the position illustrated in which the vent 16 is shut off. If for any reason the gas flow in line 1 drops below the "low" limit of the primary meter, the nozzle and flapper unit 32 is opened by the adjustable set screw 37. This vents the chamber 27 to the atmosphere. The parts remain in the position illustrated since the reduction in pressure in the chamber 27 increases the force tending to hold the valve 12 in the lower position.

Since the flow into the chamber 27 is limited by the capacity of the restricted passageway 28, the leakage is not serious. Under the normal conditions when the flow in the line 1 is within the capacity of the primary meter 3 there is no leakage.

When the flow through the line 1 exceeds the desired capacity to be registered on the primary meter 3, the nozzle and flapper unit 34 is opened by the set screw 36 on the arm 35. This vents the chamber 29 to the atmosphere. The pressure in the chamber 29 accordingly drops since the chamber is fed through a restriction 30 having less capacity than the line 33 leading to the nozzle and flapper unit 34. The differential in pressure on the diaphragm 20 causes the diaphragm to move upward and the valve 12 is accordingly moved upward by the spring 18 shutting off the pressure supply to the line 9 and opening the vent passageway 16. The venting of the control pressure in the line 9, which takes place primarily through the vent passageway 16, reduces the pressure on the upper side of the diaphragm 8 and results in opening of the valve 6 by the spring 7 and cutting the secondary meter 5 into operation. By adjusting the pressure drop at which the valve 6 opens, the valve 6 opens after the valve 12 reaches the upper position shutting off the pressure supply to the valve 6. From one aspect, there is a time delay in the actuation of the valve 6 which insures operation of the valve 6 after operation of the valve 12. As soon as the secondary meter is cut into operation the flow through the primary meter 3 drops and the nozzle and flapper unit 34 closes. The pressure in the chamber 29 continues at atmospheric pressure since the chamber is vented through the passageway 16. The pressure in the chamber 27 continues to remain at supply line pressure since the full line pressure is supplied to the chamber through the restricted passageway 28.

If, for any reason, the flow in the gas line 1 exceeds the combined capacity of the meters 3 and 5, the nozzle and flapper unit 34 may be lifted off by the set screw 36. This will have no effect since there is no pressure in the chamber 29.

While the meters 3 and 5 are in operation, if the flow through the meter 3 drops below the "low" value, it is desirable that the secondary meter 5 be cut out of operation. Under this condition the nozzle and flapper unit 32 is opened by the set screw 37 and the chamber 27 is vented to atmosphere. Since the pressure in the chamber 29 is already at atmospheric pressure the venting of the chamber 27 equalizes the pressure on opposite sides of the diaphragm 20 and results in a downward movement of the valve 12 due to the greater biasing force of the spring 24. Movement of the valve 12 to the position illustrated closes the vent passageway 16 and opens the control pressure line 9 to the supply pressure. This results in the closing of the valve 6. The cutting off of the secondary meter 5 resulting from the closure of the valve 6 causes an increase in the registration of the primary meter 3. This results in a closure of the nozzle and flapper unit 32. The pressure in the chambers 27 and 29 accordingly builds up through the restricted passageways 28 and 30 to the line pressure. Because the passageway 28 is more restricted than the passageway 30 there is no danger of the valve 12 moving from the lower position illustrated. The closing of the valve 6 to cut off the secondary meter takes place after the valve 12 moves to the lower position illustrated in Fig. 2. This is due to the setting of the pressure differential required to close the valve.

The operation of the relay is always completed i. e. the valve 12 is in the fully raised or the fully lowered position before the valve 6 is actuated to cut the secondary meter 5 in or out. This prevents oscillation or instability of the relay. If the valve 6 changed its position ahead of the valve 12, the accompanying change in the registration of the primary meter would be in the direction to prevent the valve 12 from completing its movement. For example, when the primary meter registers "high," the opening of the nozzle flapper unit 34 initiates the movement of the valve 12 toward the upper position. If the valve 6 opens and cuts the secondary meter in before the valve 12 reaches the upper position, the registration of the primary meter will drop below high and the movement of the valve toward the upper position will be stopped and it will start toward the lower position. As the valve 12 approaches the lower position, the valve 6 will close thereby cutting out the secondary meter and increasing the registration of the primary meter which will again rise to "high." This oscillation cannot take place if the actuation of the valve 6 always follows that of the valve 12.

What I claim as new is:

1. In a gas metering system having a secondary metering circuit to be cut in to supplement a primary metering circuit whenever the flow exceeds the desired capacity of the primary metering circuit, a pressure operated control for the secondary metering circuit, a valve in the pressure supply to the control, said valve having a way fed from the pressure supply, a bleeder port, a way leading to the pressure operated control, and a valve member for alternatively shutting and opening the way from the pressure supply and opening and shutting the bleeder port, a pair of normally closed nozzle and flapper units, means responsive to the indication of the primary metering circuit for respectively opening one and then the other of the units at the desired upper and lower limits of indication for the primary metering circuit, a diaphragm controlling the valve member, the pressure on one side of the diaphragm being vented through one of the units and the pressure on the other side of the diaphragm being vented through the other of the units, a restricted passageway connecting one side of the diaphragm with the pressure supply line, and a restricted passageway connecting the other side of the diaphragm with the way leading to the pressure operated control.

2. In combination, a pressure operated control, a valve for connection in a pressure supply, said valve having a way fed from the pressure supply, a bleeder port, a way leading to the pressure operated control, and a valve member for alternatively shutting and opening the way from the pressure supply and opening and shutting the bleeder port, a diaphragm controlling the valve member, a line with a restriction therein leading from the pressure supply to one side of the diaphragm, a line with a restriction therein leading from the pressure operated control to the other side of the diaphragm, a pair of normally closed nozzle and flapper units respectively venting one and the other side of the diaphragm, said diaphragm being effective to move the valve member to open the way from the supply pressure when the pressures on opposite sides of the diaphragm are equal.

3. In combination, a pressure operated control, a valve for connection to a pressure supply, said valve having a way fed from the pressure supply, a bleeder port, a way leading to the pressure operated control, and a valve member for alternatively shutting and opening the way from the pressure supply and opening and shutting the bleeder port, diaphragm means controlling the valve member having a delayed response to the supply pressure and the control pressure in the way leading to the pressure operated control and actuated by the difference therebetween, and means including a pair of normally closed nozzle and flapper units respectively venting the supply pressure and control pressure in the diaphragm means at rates faster than the response of the diaphragm means to the supply and control pressures.

ROBERT B. GRAY.

REFERENCES CITED

The following references are of record in the file of this patent:

UNITED STATES PATENTS

| Number | Name | Date |
| --- | --- | --- |
| 2,065,702 | Hubbard | Dec. 29, 1936 |
| 2,240,244 | Cook | Apr. 29, 1941 |
| 2,299,884 | Edwards | Oct. 27, 1942 |

FOREIGN PATENTS

| Number | Country | Date |
| --- | --- | --- |
| 480,502 | Germany | Aug. 3, 1929 |